US011377373B2

United States Patent
Wang et al.

(12) United States Patent
(10) Patent No.: US 11,377,373 B2
(45) Date of Patent: Jul. 5, 2022

(54) ELECTROCHEMICAL MEMBRANE MODULE FOR SELECTIVELY REMOVING POLLUTANTS AND PREPARATION METHOD THEREOF

(71) Applicant: Tongji University, Shanghai (CN)

(72) Inventors: Zhiwei Wang, Shanghai (CN); Mei Chen, Shanghai (CN); Zhichao Wu, Shanghai (CN)

(73) Assignee: TONGJI UNIVERSITY, Shanghai (CN)

(*) Notice: Subject to any disclaimer, the term of this patent is extended or adjusted under 35 U.S.C. 154(b) by 159 days.

(21) Appl. No.: 16/845,093

(22) Filed: Apr. 10, 2020

(65) Prior Publication Data

US 2021/0009446 A1 Jan. 14, 2021

(30) Foreign Application Priority Data

Jul. 10, 2019 (CN) ........................ 201910618472.6

(51) Int. Cl.

| | |
|---|---|
| ***B01D 67/00*** | (2006.01) |
| ***B01D 71/02*** | (2006.01) |
| ***C02F 1/44*** | (2006.01) |
| ***C02F 1/461*** | (2006.01) |

(Continued)

(52) U.S. Cl.

CPC ........ *C02F 1/46109* (2013.01); *B01D 61/147* (2013.01); *B01D 65/08* (2013.01);

(Continued)

(58) Field of Classification Search

CPC ................ B01D 67/0079; B01D 69/12; B01D 2311/2684; B01D 2311/2688; C02F 3/1268

See application file for complete search history.

(56) References Cited

FOREIGN PATENT DOCUMENTS

| | | | |
|---|---|---|---|
| CN | 104047019 A | * | 9/2014 |
| CN | 107162118 A | * | 9/2017 |

OTHER PUBLICATIONS

Lin, Hui, et al. "Electrochemical degradation of perfluorooctanoic acid (PFOA) by Ti/SnO2—Sb, Ti/SnO2—Sb/PbO2 and Ti/SnO2—Sb/MnO2 anodes." Water research 46.7 (2012): 2281-2289. (Year: 2012).*

(Continued)

*Primary Examiner* — Bradley R Spies

(74) *Attorney, Agent, or Firm* — Dragon Sun Law Firm, PC; Jinggao Li, Esq.; Nathaniel Perkins

(57) ABSTRACT

An electrochemical membrane module for selectively removing pollutants and a preparation method thereof are provided. A Ti/$SnO_2$—Sb substrate electrode is coated with a MI—$TiO_2$ sol-gel by means of a dip-coating method, and then sintered to obtain a molecular imprinting type Ti/MI—$TiO_2$/$SnO_2$—Sb coated electrode; the coated electrode is adhered to a ceramic micro-filtration membrane using epoxy resin glue to obtain a Ti/MI—$TiO_2$/$SnO_2$—Sb MI-anodic conductive composite membrane; the MI-anodic conductive composite membrane is used as an anode, and a titanium mesh is used as a cathode, so that the electrochemical membrane module capable of selectively removing pollutants is obtained. The invention effectively combines an electrochemical micro-filtration membrane and a molecular imprinting technique. When the electrochemical membrane module is used, suspended particles and refractory organics in the sewage are removed, and a highly selective removal of certain refractory pollutants can be achieved.

6 Claims, 2 Drawing Sheets

40 62 60 61 10 63 20 50 30 51 52 53

(51) Int. Cl.
*C02F 3/12* (2006.01)
*B01D 61/14* (2006.01)
*B01D 65/08* (2006.01)
*B01D 69/12* (2006.01)

(52) U.S. Cl.
CPC ......... *B01D 67/0079* (2013.01); *B01D 69/12* (2013.01); *B01D 71/02* (2013.01); *C02F 1/444* (2013.01); *C02F 3/1268* (2013.01); *B01D 2311/2684* (2013.01); *B01D 2311/2688* (2013.01); *B01D 2313/345* (2013.01); *B01D 2321/185* (2013.01); *C02F 2001/46138* (2013.01); *C02F 2001/46157* (2013.01); *C02F 2201/4617* (2013.01); *C02F 2201/4619* (2013.01); *C02F 2201/46115* (2013.01); *C02F 2201/46135* (2013.01); *C02F 2209/38* (2013.01); *C02F 2303/20* (2013.01)

(56) References Cited

OTHER PUBLICATIONS

Zheng, Junjian, et al. "Supporting Information: Development of an electrochemical ceramic membrane filtration system for efficient contaminant removal from waters." Environmental science & technology 52.7 (2018) (Year: 2018).*

Wu Zhichao et al—CN-107162118-A machine translation—2017 (Year: 2017).*

Zhang Ya Nan—CN-104047019-A machine translation—2014 (Year: 2014).*

Junjian Zheng et al, Development of an Electrochemical Ceramic Membrane Filtration System for Efficient Contaminant Removal from Waters, Environ Sci. Technol. 2018, 52, 4117-4126.

* cited by examiner

ELECTROCHEMICAL MEMBRANE MODULE FOR SELECTIVELY REMOVING POLLUTANTS AND PREPARATION METHOD THEREOF

CROSS REFERENCE TO THE RELATED APPLICATIONS

This application is based upon and claims priority to Chinese Patent Application No. 201910618472.6, filed on Jul. 10, 2019, the entire contents of which are incorporated herein by reference.

TECHNICAL FIELD

The present invention relates to an electrochemical membrane module and a preparation method thereof, in particular to an electrochemical membrane module for selectively removing target pollutants and a preparation method thereof. The present invention belongs to the technical field of membrane separation.

BACKGROUND

The widely use of pharmaceutical, antibiotics, antibacterial agents and other compounds will lead them into natural waters through various channels. These emerging pollutants are generally highly toxic, refractory to biodegradation, pathogenic and even teratogenic at a relatively low concentration (ranging from ng/L to μg/L). Moreover, these highly toxic micro-pollutants generally coexist with some low-toxic but highly concentrated biodegradable organics.

Electrochemical advanced oxidation process is an emerging sewage treatment technology that can effectively remove refractory pollutants from sewage. By applying an electric field, oxidant substances (such as hydroxyl radicals, $H_2O_2$, etc.) can be generated in situ to degrade refractory organic pollutants in water. The combined technology of electrochemistry and membrane separation has been extensively demonstrated to be capable of effectively removing refractory organics. However, due to the non-selectivity of the strong oxidants (such as HO., etc.) generated by electrochemical oxidation technology, it is difficult for electrochemical membrane separation technology to selectively remove certain pollutants in water. Achieving a selective removal of certain refractory organics in water is in an urgent need for the current research and practice.

SUMMARY

In view of the problems in the prior art, the present invention provides an electrochemical membrane module for selectively removing pollutants and a preparation method thereof. The electrochemical membrane module can realize an effective combination of the electrochemical micro-filtration membrane technology and the molecular imprinting technology. When the electrochemical membrane module is used in a membrane reactor and operated in a continuous flow mode, not only the removal of suspended particles and refractory organics in the sewage can be achieved, but the highly selective removal of certain refractory pollutants can also be achieved.

To achieve the above technical purpose, the technical solutions of the present invention are as follows.

An electrochemical membrane module for selectively removing pollutants includes a membrane bracket, molecular imprinting (MI)-anodic composite membranes, and a titanium mesh, wherein the membrane bracket is provided with a suction port connecting with the inner cavity of the membrane bracket, the inner cavity of the membrane bracket cavity is incorporated with the titanium mesh as a cathode, and both outer sides of the membrane bracket are integrated with the MI-anodic composite membranes, each MI-anodic composite membrane includes a Ti—$SnO_2$—Sb substrate electrode and a ceramic micro-filtration membrane, wherein the substrate electrode is placed opposite to the inner cavity of the membrane bracket, and the substrate electrode is coated with a molecular imprinting (MI)—$TiO_2$ sol-gel coating.

A method for preparing the above electrochemical membrane module includes the steps of:

(1) immersing the Ti—$SnO_2$—Sb substrate electrode into MI—$TiO_2$ sol-gel, and sintering to obtain a coated electrode deposited with the $TiO_2$ sol-gel coating on the surface, and then adhering the coated electrode to the surface of the ceramic micro-filtration membrane with epoxy resin to obtain the MI-anodic composite membrane;

(2) vertically inserting the titanium mesh in the membrane bracket as the cathode, and adhering two MI-anodic composite membranes obtained in the step (1) to both outer sides of the membrane bracket directly opposite to the cathode, wherein the substrate electrode is placed opposite to the inner cavity of the membrane bracket.

Preferably, the method for preparing the Ti—$SnO_2$—Sb substrate electrode includes: preparing the sol-gel having a Sn:Sb of 9:1, coating the sol-gel on the titanium mesh with a pore diameter of 100 μm and a thickness of 200 μm, and sintering to obtain the Ti/$SnO_2$—Sb substrate electrode.

Preferably, the method for preparing the MI—$TiO_2$ sol-gel includes: adding titanium alkoxide and template molecule into absolute ethanol and stirring to obtain a molecular imprinting precursor solution A, and then mixing water, absolute ethanol and glacial acetic acid under stirring to obtain a reaction medium solution B, finally adding B to A dropwise under stirring to obtain the MI—$TiO_2$ sol-gel.

Preferably, the titanium alkoxide is any one of tetrabutyl titanate, isopropyl titanate and titanium isopropoxide.

Preferably, the template molecule is any one of 2,4-dichlorophenoxyacetic acid, 3,4-dichlorophenoxyacetic acid, 2,3-dichlorophenoxyacetic acid, and p-chlorophenol.

Preferably, the target pollutant:titanium alkoxide:absolute ethanol:glacial acetic acid:water is in a molar ratio of 0.5:1:18:2:8.

A membrane bioreactor employing the above electrochemical membrane module includes an inlet pipe, a reactor casing, an electrochemical membrane module, a power supply, an aeration system, and an outlet pipe; one end of the inlet pipe is inserted in the reactor casing; the electrochemical membrane module is placed in the reactor casing, the suction port of the electrochemical membrane module is connected with the outlet pipe, and the titanium mesh and the MI-anodic composite membrane of the electrochemical membrane module are connected to the negative pole and the positive pole of the power supply by wires, respectively; the aeration system includes an aeration tube, a gas flowmeter and an air pump, the aeration tube is located below the electrochemical membrane module, and the gas flowmeter is used for regulating the intake air; and the outlet pipe is provided with a peristaltic pump.

Preferably, the power supply is a regulated DC power supply, and a voltage range of the power supply is 0.5-4 V.

The above membrane bioreactor can be used in sewage treatment.

As abovementioned, the present invention has the following advantages:

1. According to the present invention, the Ti/$SnO_2$—Sb substrate electrode is coated with the MI—$TiO_2$ sol-gel by the dip-coating method and then sintering to obtain the molecular imprinting type Ti/MI—$TiO_2$/$SnO_2$—Sb coated electrode, and the coated electrode is adhered to the ceramic micro-filtration membrane by using epoxy resin glue, to obtain the Ti/MI—$TiO_2$/$SnO_2$—Sb molecular imprinting (MI)-anodic conductive composite membrane, and then the MI-anodic-conductive composite membrane is used as the anode, and the titanium mesh is used as the cathode, to obtain the electrochemical membrane module for selectively removing pollutants. Therefore, the present invention realizes an effective combination of the electrochemical micro-filtration membrane and the molecular imprinting technology. The method according to the present invention is simple and easy to operate.

2. When the selective electrochemical membrane module of the present invention is operated in a continuous flow mode by applying an electric field, the hydroxyl radical generated at the anode can achieve preliminary oxidation of the target pollutant, and the intermediate products of electrooxidation can be further oxidized and degraded by the strong oxidant substances generated on the cathode surface, so that the efficient removal of refractory organics can be achieved. Specifically, the target pollutants having the same size, spatial structure and functional group as the imprinting sites are preferentially adsorbed on the surface of the Ti/MI—$TiO_2$/$SnO_2$—Sb molecular imprinting coated electrode, so as to be preferentially degraded. In addition, the introduction of molecular imprinting sites can also reduce the width of the energy band gap in $TiO_2$, accelerate the electron transition from the valence band to the conduction band, promote the generation of oxidative substances such as hydroxyl radicals, effectively increase the yield of strong oxidant substances, and improve the removal efficiency of refractory organics in water.

3. The selective electrochemical membrane module of the present invention is built in the ceramic micro-filtration membrane, and the ceramic micro-filtration membrane can effectively reject particles, colloids and macromolecular pollutants in the reactor, thus mitigating the fouling of anode and the cathode.

4. The membrane reactor of the present invention can effectively reduce the membrane pore blockage of the MI-anodic composite membrane and mitigate the membrane fouling by providing an aeration system, which produces an aeration disturbance to uniformly mix the water in the reactor and cause a scouring effect of the bubbles on the surface of the ceramic micro-filtration membrane, so as to prolong the service life of the electrochemical membrane module.

5. The membrane reactor of the present invention can be used in a real sewage treatment by combining with the biological treatment method to improve the effect of sewage treatment when the voltage range of the regulated DC power supply is set from 0.5 to 4 V and operated in the continuous flow mode, because the applied low electric field has no side effect on the microorganism.

6. No chemical addition is needed and thus secondary pollution will be avoided when the membrane reactor of the present invention is used in the sewage treatment.

REFERENCE NUMBERS

Figure 1:
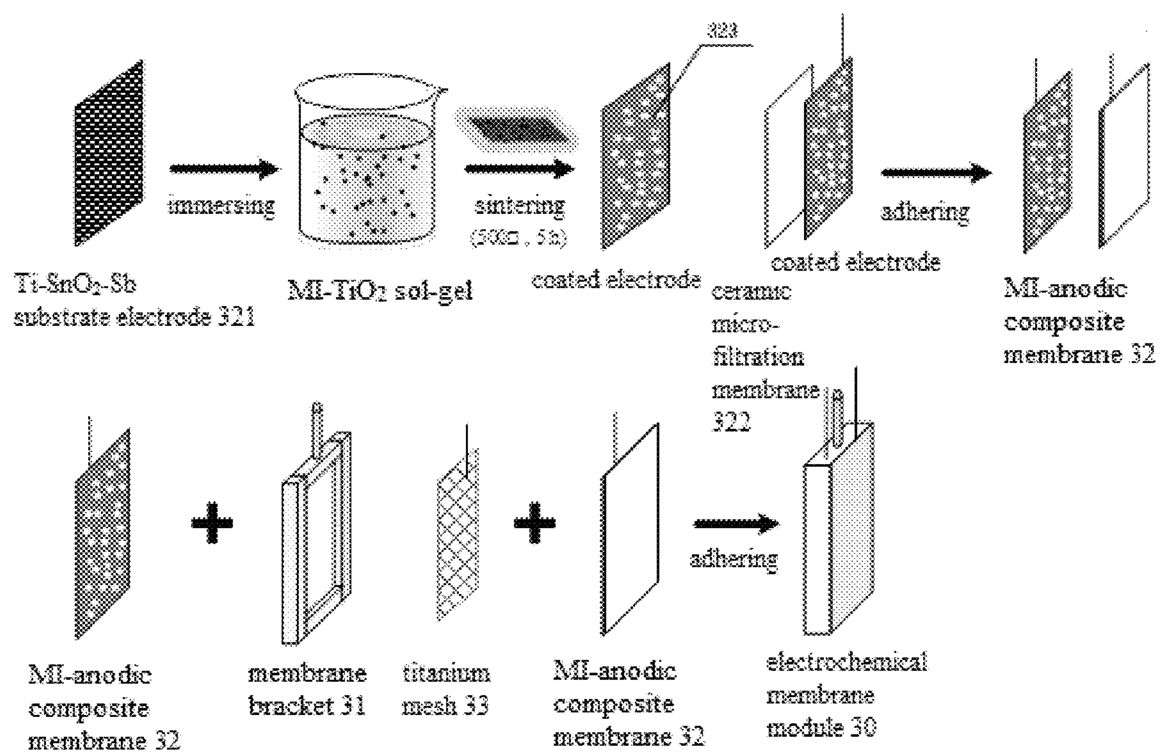
FIG. 1 is a schematic diagram of the preparation process of the electrochemical membrane module of the present invention.

10. inlet pipe
20. reactor casing
30. electrochemical membrane module
31. membrane bracket
32. MI-anodic composite membrane
321. Ti—$SnO_2$—Sb substrate electrode
322. ceramic micro-filtration membrane
323. $TiO_2$ sol-gel coating
33. titanium mesh
40. power supply
50. aeration system
51. aeration tube
52. gas flowmeter
53. air pump
60. outlet pipe
61. peristaltic pump
62. pressure gauge
63. flowmeter

DETAILED DESCRIPTION OF THE EMBODIMENTS

The features of the present invention are further described by the following embodiments, but the claims of the present invention are not limited thereby.

Embodiment 1

An electrochemical membrane module for selectively removing pollutants includes a membrane bracket, MI-anodic composite membranes, and a titanium mesh, wherein the membrane bracket is provided with a suction port connecting with the inner cavity of the membrane bracket, the inner cavity of the membrane bracket is internally incorporated with the titanium mesh as a cathode, and both outer sides of the membrane bracket are integrated with the MI-anodic composite membranes, the MI-anodic composite membrane includes a Ti—$SnO_2$—Sb substrate electrode and a ceramic micro-filtration membrane, wherein the substrate electrode is placed opposite to the inner cavity of the membrane bracket, and the substrate electrode is coated with a MI—$TiO_2$ sol-gel coating.

As shown in FIG. 1, the preparation method of the above electrochemical membrane module for selectively removing pollutants includes the steps of:

(1) Preparation of Ti—$SnO_2$—Sb substrate electrode: according to the literature [Zheng, J.; Wang, Z.; Ma, J.; Xu, S.; Wu, Z. Development of an electrochemical ceramic membrane filtration system for efficient contaminant removal from waters. Environ. Sci. Technol. 2018, 52(7), 4117-41261.], a sol-gel with a Sn:Sb of 9:1 was prepared, which was then coated on the titanium mesh having a pore size of 100 μm, a thickness of 200 μm, and a size of 5 cm*8 cm, and the Ti—$SnO_2$—Sb substrate electrode was obtained after sintering the coated titanium mesh;

(2) Preparation of MI—$TiO_2$ sol-gel: titanium source (tetrabutyl titanate) and template molecule (2,4-dichlorophenoxyacetic acid) were added into absolute ethanol and stirred to obtain the molecular imprinting precursor solution A, and then water, absolute ethanol and glacial acetic acid were mixed under stirring to obtain the reaction medium solution B, finally, B was added into A dropwise under stirring to obtain the MI—$TiO_2$ sol-gel; wherein the molar ratio of 2,4-dichlorophenoxyacetic acid:tetrabutyl titanate: absolute ethanol:glacial acetic acid:water was 0.5:1:18:2:8; the titanium mesh had a pore diameter of 100 μm and a thickness of 200 μm; the ceramic micro-filtration membrane consisted of $ZrO_2$ and $Al_2O_3$, and the pore size of the ceramic micro-filtration membrane was 0.25 μm;

(3) Preparation of MI-anodic composite membrane: the Ti—$SnO_2$—Sb substrate electrode was immersed in the MI—$TiO_2$ sol-gel, then sintered to obtain an electrode coated with the $TiO_2$ sol-gel, and then the electrode was adhered to the surface of the ceramic micro-filtration membrane by epoxy resin, to obtain the MI-anodic composite membrane;

(4) Preparation of electrochemical membrane module: the titanium mesh was vertically inserted in the membrane bracket as a cathode, and two MI-anodic composite membranes obtained in the step (3) were adhered to both outer sides of the membrane bracket directly opposite to the cathode, wherein the distance between the anode and the cathode was set at 1.0 cm, the substrate electrode was placed opposite to the inner cavity of the membrane bracket, to obtain the electrochemical membrane module for selectively removing pollutants (labeled as C1).

Figure 2:
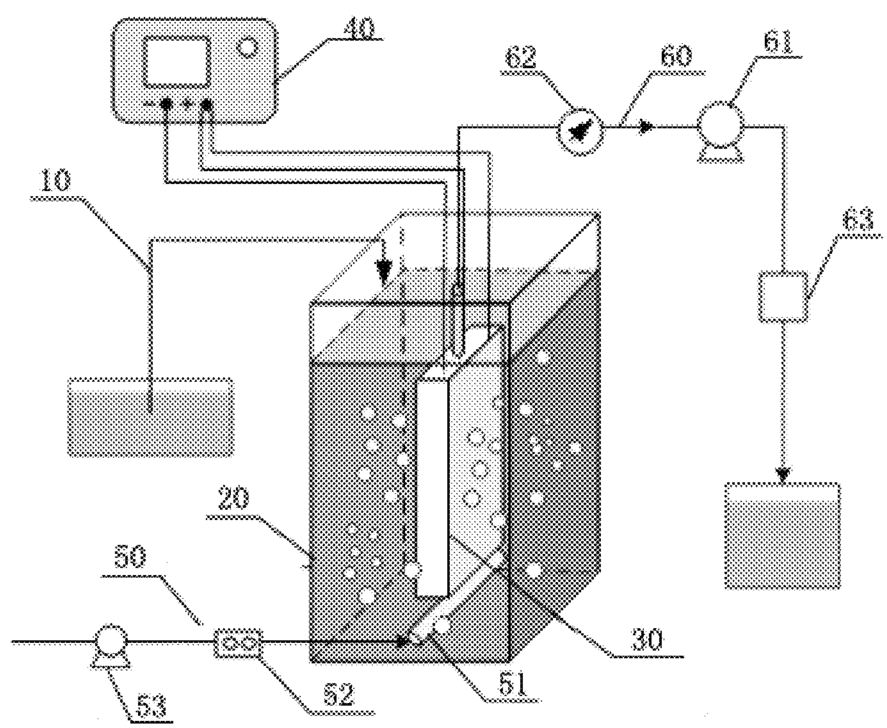
FIG. 2 is a schematic diagram of the membrane reactor structure of the present invention.

As shown in FIG. 2, the membrane bioreactor employing the above electrochemical membrane module includes inlet pipe 10, reactor casing 20, electrochemical membrane module 30, power supply 40, aeration system 50, and outlet pipe 60; one end of inlet pipe 10 is placed in reactor casing 20; electrochemical membrane module 30 is placed in reactor casing 20, and electrochemical membrane module 30 includes membrane bracket 31, MI-anodic composite membranes 32, and titanium mesh 33, membrane bracket 31 is provided with a suction port connecting with the inner cavity of the membrane bracket, and the suction port is connected with outlet pipe 60, titanium mesh 33 is inserted in the inner cavity of the membrane bracket as a cathode, and titanium mesh 33 is connected to the negative pole of the power supply by a wire, both outer sides of the membrane bracket are provided with MI-anodic composite membranes 32, MI-anodic composite membranes 32 are connected to the positive pole of power supply 40 through wires, and MI-anodic composite membrane 32 includes Ti—$SnO_2$—Sb substrate electrode 321 and ceramic micro-filtration membrane 322, wherein substrate electrode 321 is placed opposite to the inner cavity of the membrane bracket, and substrate electrode 321 is coated with MI—$TiO_2$ sol-gel coating 323, and ceramic micro-filtration membrane 322 is placed facing the water; power supply 40 is a regulated DC power supply, and the voltage range of power supply 40 is from 0.5 to 4 V; aeration system 50 includes aeration tube 51, gas flowmeter 52, and air pump 53, aeration tube 51 is located below electrochemical membrane module 30, and gas flowmeter 52 is used to regulate the flow rate of intake air; outlet pipe 60 is provided with peristaltic pump 61, pressure gauge 62 and flowmeter 63.

A low-concentration sewage containing 2,4-dichlorophenoxyacetic acid and sulfamethoxazole (interfering substance) was treated by the above membrane bioreactor, and the experimental conditions were set as: the concentrations of influent pollutants (2,4-dichlorophenoxyacetic acid and sulfamethoxazole) were 1 mg/L, pH=7.0, the hydraulic retention time was 4 h, and the voltage of the regulated DC power supply was 3 V. The results showed that the removal rate of the target pollutant 2,4-dichlorophenoxyacetic acid by the electrochemical membrane module C1 was 89%, and the selectivity coefficient was 4.5.

Embodiment 2

An electrochemical membrane module for selectively removing pollutants includes a membrane bracket, MI-anodic composite membranes, and a titanium mesh, the membrane bracket is provided with a suction port connecting with the inner cavity of the membrane bracket, the inner cavity of the membrane bracket is internally incorporated with the titanium mesh as a cathode, and both outer sides of the membrane bracket are integrated with the MI-anodic composite membranes, the MI-anodic composite membrane includes a Ti—$SnO_2$—Sb substrate electrode and a ceramic micro-filtration membrane, wherein the substrate electrode is placed opposite to the inner cavity of the membrane bracket, and the substrate electrode is coated with a MI—$TiO_2$ sol-gel coating.

The preparation method of the above electrochemical membrane module for selectively removing pollutants includes the steps of:

(1) Preparation of Ti—$SnO_2$—Sb substrate electrode: according to the literature [Zheng, J.; Wang, Z.; Ma, J.; Xu, S.; Wu, Z. Development of an electrochemical ceramic membrane filtration system for efficient contaminant removal from waters. Environ. Sci. Technol. 2018, 52, (7), 4117-4126.], a sol-gel with a Sn:Sb of 9:1 was prepared, which was then coated on the titanium mesh having a pore size of 100 μm, a thickness of 200 μm, and a size of 5 cm*8 cm, the Ti/$SnO_2$—Sb substrate electrode was obtained after sintering the coated titanium mesh;

(2) Preparation of MI—$TiO_2$ sol-gel: titanium source (isopropyl titanate) and template molecule (3,4-dichlorophenoxyacetic acid) were added into absolute ethanol and stirred to obtain the molecular imprinting precursor solution A, and then water, absolute ethanol and glacial acetic acid were mixed under stirring to obtain the reaction medium solution B, finally B was added into A dropwise under stirring to obtain the MI—$TiO_2$ sol-gel; wherein the molar ratio of 3,4-dichlorophenoxyacetic acid:isopropyl titanate: absolute ethanol:glacial acetic acid:water was 0.5:1:18:2:8; the titanium mesh had a pore diameter of 100 μm and a thickness of 200 μm; the ceramic micro-filtration membrane consisted of $ZrO_2$ and $Al_2O_3$, and the membrane pore size of the ceramic micro-filtration membrane was 0.25 μm;

(3) Preparation of MI-anodic composite membrane: the Ti—$SnO_2$—Sb substrate electrode was immersed in the MI—$TiO_2$ sol-gel, then sintered to obtain an electrode coated with the $TiO_2$ sol-gel, and then the electrode was adhered to the surface of the ceramic micro-filtration membrane by epoxy resin, to obtain the MI-anodic composite membrane;

(4) Preparation of electrochemical membrane module: the titanium mesh was vertically inserted in the membrane bracket as a cathode, and two MI-anodic composite membranes obtained in the step (3) were adhered to the both outer sides of the membrane bracket directly opposite to the cathode, wherein the distance between the anode and the cathode was set at 1.0 cm, the substrate electrode was placed opposite to the inner cavity of the membrane bracket, to obtain the electrochemical membrane module for selectively removing pollutants (labeled as C2).

The membrane bioreactor employing the above electrochemical membrane module includes inlet pipe 10, reactor casing 20, electrochemical membrane module 30, power supply 40, aeration system 50, and outlet pipe 60; one end of inlet pipe 10 is inserted in reactor casing 20; electrochemical membrane module 30 is placed in reactor casing 20, and electrochemical membrane module 30 includes membrane bracket 31, MI-anodic composite membranes 32, and titanium mesh 33, membrane bracket 31 is provided with a suction port connecting with the inner cavity of the membrane bracket, and the suction port is connected with outlet pipe 60, titanium mesh 33 is inserted in the inner cavity of the membrane bracket as a cathode, and titanium mesh 33 is connected to the negative pole of the power supply by a wire, both outer sides of the membrane bracket are provided with MI-anodic composite membranes 32, MI-anodic composite membranes 32 are connected to the positive pole of power supply 40 through wires, and MI-anodic composite membrane 32 includes Ti—$SnO_2$—Sb substrate electrode 321 and ceramic micro-filtration membrane 322, wherein substrate electrode 321 is placed opposite to the inner cavity of the membrane bracket, and substrate electrode 321 is coated with MI—$TiO_2$ sol-gel coating 323, and ceramic micro-filtration membrane 322 was placed facing the water; power supply 40 is a regulated DC power supply, and the voltage range of power supply 40 is from 0.5 to 4 V; aeration system 50 includes aeration tube 51, gas flowmeter 52, and air pump 53, aeration tube 51 is located below electrochemical membrane module 30, and gas flowmeter 52 is used to regulate the flow rate of intake air; outlet pipe 60 is provided with peristaltic pump 61, pressure gauge 62 and flow meter 63.

A low-concentration sewage containing 3,4-dichlorophenoxyacetic acid and sulfamethoxazole (interfering substance) was treated by the above membrane bioreactor, and the experimental conditions were set as: the concentrations of influent pollutants were 1 mg/L, pH=7.0, the hydraulic retention time was 4 h, and the voltage of the regulated DC power supply was 3 V. The results showed that the removal rate of the target pollutant 3,4-dichlorophenoxyacetic acid by the electrochemical membrane module C2 was 90%, and the selectivity coefficient was 4.8.

Embodiment 3

An electrochemical membrane module for selectively removing pollutants includes a membrane bracket, MI-anodic composite membranes, and a titanium mesh, wherein the membrane bracket is provided with a suction port connecting with the inner cavity of the membrane bracket, the inner cavity of the membrane bracket is internally provided with the titanium mesh as a cathode, and both outer sides of the membrane bracket are provided with the MI-anodic composite membranes, the MI-anodic composite membrane includes a Ti—$SnO_2$—Sb substrate electrode and a ceramic micro-filtration membrane, wherein the substrate electrode is placed opposite to the inner cavity of the membrane bracket, and the substrate electrode is coated with a MI—$TiO_2$ sol-gel coating.

The preparation method of the above electrochemical membrane module for selectively removing pollutants includes the steps of:

(1) Preparation of Ti—$SnO_2$—Sb substrate electrode: according to the literature [Zheng, J.; Wang, Z.; Ma, J.; Xu, S.; Wu, Z. Development of an electrochemical ceramic membrane filtration system for efficient contaminant removal from waters. Environ. Sci. Technol. 2018, 52, (7), 4117-4126.], a sol-gel with a Sn:Sb of 9:1 was prepared, which was then coated on the titanium mesh having a pore size of 100 μm, a thickness of 200 μm, and a size of 5 cm*8 cm, and, the Ti/$SnO_2$—Sb substrate electrode was obtained after sintering the coated titanium mesh;

(2) Preparation of MI—$TiO_2$ sol-gel: titanium source (titanium isopropoxide) and template molecule (p-chlorophenol) were added into absolute ethanol and stirred to obtain the molecular imprinting precursor solution A, and then water, absolute ethanol and glacial acetic acid were mixed under stirring to obtain the reaction medium solution B, finally B was added into A dropwise under stirring to obtain the MI—$TiO_2$ sol-gel; wherein the molar ratio of p-chlorophenol:titanium isopropoxide:absolute ethanol:glacial acetic acid:water was 0.5:1:18:2:8; the titanium mesh had a pore diameter of 100 μm and a thickness of 200 μm; the ceramic micro-filtration membrane consisted of $ZrO_2$ and $Al_2O_3$, and the membrane pore size of the ceramic micro-filtration membrane was 0.25 μm;

(3) Preparation of MI-anodic composite membrane: the Ti—$SnO_2$—Sb substrate electrode was immersed in the MI—$TiO_2$ sol-gel, then removed and sintered to obtain an electrode coated with the $TiO_2$ sol-gel, and then the electrode was adhered to the surface of the ceramic micro-filtration membrane by epoxy resin, to obtain the MI-anodic composite membrane;

(4) Preparation of electrochemical membrane module: the titanium mesh was vertically inserted in the membrane bracket as a cathode, and two MI-anodic composite membranes obtained in the step (3) were adhered to both outer sides of the membrane bracket directly opposite to the cathode, wherein the distance between the anode and the cathode was set at 1.0 cm, the substrate electrode was placed opposite to the inner cavity of the membrane bracket, to obtain the electrochemical membrane module for selectively removing pollutants (labeled as C3).

The membrane bioreactor employing the above electrochemical membrane module includes inlet pipe 10, reactor casing 20, electrochemical membrane module 30, power supply 40, aeration system 50, and outlet pipe 60; one end of inlet pipe 10 is placed in reactor casing 20; electrochemical membrane module 30 is placed in reactor casing 20, and t electrochemical membrane module 30 includes membrane bracket 31, MI-anodic composite membranes 32, and titanium mesh 33, membrane bracket 31 is provided with a suction port connecting with the inner cavity of the membrane bracket, and the suction port is connected with outlet pipe 60, titanium mesh 33 is inserted in the inner cavity of the membrane bracket as a cathode, and titanium mesh 33 is connected to the negative pole of the power supply by a wire, both outer sides of the membrane bracket are provided with MI-anodic composite membranes 32, MI-anodic composite membranes 32 are connected to the positive pole of power supply 40 through wires, and MI-anodic composite membrane 32 includes Ti—$SnO_2$—Sb substrate electrode 321 and ceramic micro-filtration membrane 322, wherein substrate electrode 321 is placed opposite to the inner cavity of the membrane bracket, and substrate electrode 321 is coated with MI—$TiO_2$ sol-gel coating 323, and ceramic micro-filtration membrane 322 is placed facing the water; power supply 40 is a regulated DC power supply, and the voltage range of power supply 40 is from 0.5 to 4 V; aeration system 50 includes aeration tube 51, gas flowmeter 52, and air pump 53, aeration tube 51 is located below electrochemical membrane module 30, and gas flowmeter 52 is used to regulate the flow rate of intake air; outlet pipe 60 is provided with peristaltic pump 61, pressure gauge 62 and flow meter 63.

A low-concentration sewage containing p-chlorophenol and sulfamethoxazole (interfering substance) was treated by the above membrane bioreactor, and the experimental conditions were set as: the concentrations of influent pollutants were 1 mg/L, pH=7.0, the hydraulic retention time was 4 h, and the voltage of the regulated DC power supply was 1 V.

The results showed that the removal rate of the target pollutant p-chlorophenol by the electrochemical membrane module C3 was 87%, and the selectivity coefficient was 4.0.

Comparative Example 1

An electrochemical membrane module (labeled as D) was prepared in the same manner as in Embodiment 1 except that 2,4-dichlorophenoxyacetic acid was not added in the preparation step (2) of the electrochemical membrane module.

A membrane bioreactor employing the above electrochemical membrane module was also prepared, in which the only part different from membrane bioreactor of Embodiment 1 is the electrochemical membrane modules used.

A low-concentration sewage containing 2,4-dichlorophenoxyacetic acid and sulfamethoxazole (interfering substance) was treated by the above membrane bioreactor, and the experimental conditions were the same as those in Embodiment 1. The results showed that the removal rate of the target pollutant 2,4-dichlorophenoxyacetic acid by the electrochemical membrane module D was 51%, and the selectivity coefficient was 0.9.

Comparative Example 2

An electrochemical membrane module (labeled as E) was prepared in the same manner as in Embodiment 1, except that the molar ratio of 2,4-dichlorophenoxyacetic acid, tetrabutyl titanate, absolute ethanol, glacial acetic acid and water added in the electrochemical membrane module preparation step (2) was changed to 0.4:1:18:2:8.

A membrane bioreactor employing the above electrochemical membrane module was also prepared, in which the only part different from membrane bioreactor of Embodiment 1 is the electrochemical membrane modules used.

A low-concentration sewage containing 2,4-dichlorophenoxyacetic acid and sulfamethoxazole (interfering substance) was treated by the above membrane bioreactor, and the experimental conditions were the same as those in Embodiment 1. The results showed that the removal rate of the target pollutant 2,4-dichlorophenoxyacetic acid by the electrochemical membrane module E was 78%, and the selectivity coefficient was 2.94.

Comparative Example 3

An electrochemical membrane module (labeled as F) was prepared in the same manner as in Embodiment 1, except that the molar ratio of 2,4-dichlorophenoxyacetic acid, tetrabutyl titanate, absolute ethanol, glacial acetic acid and water added in the electrochemical membrane module preparation step (2) was changed to 0.5:1:19:2:9.

A membrane bioreactor employing the above electrochemical membrane module was also prepared, in which the only part different from membrane bioreactor of Embodiment 1 is the electrochemical membrane modules used.

A low-concentration sewage containing 2,4-dichlorophenoxyacetic acid and sulfamethoxazole (interfering substance) was treated by the above membrane bioreactor, and the experimental conditions were the same as those in Embodiment 1. The results showed that the removal rate of the target pollutant 2,4-dichlorophenoxyethyl by the electrochemical membrane module F was 81.5%, and the selectivity coefficient was 3.1.

It is to be understood that the foregoing detailed description of the present invention is intended to illustrate the invention rather than limit the present invention. It will be understood by those skilled in the art that the present invention may be modified or equivalently substituted to achieve the same technical effects; as long as the application requirements are met, it is also within the scope of the present invention.

What is claimed is:

1. An electrochemical membrane module for selectively removing pollutants, comprising a membrane bracket, MI-anodic composite membranes, and a titanium mesh, wherein the membrane bracket is provided with a suction port connecting with an inner cavity of the membrane bracket, the inner cavity of the membrane bracket is internally provided with the titanium mesh as a cathode, and both outer sides of the membrane bracket are provided with the MI-anodic composite membranes, and each of the MI-anodic composite membranes comprises a Ti—$SnO_2$—Sb substrate electrode and a ceramic micro-filtration membrane, wherein the Ti—$SnO_2$—Sb substrate electrode is opposite to the inner cavity of the membrane bracket, and the Ti—$SnO_2$—Sb substrate electrode is coated with a MI—$TiO_2$ sol-gel coating;

wherein the Ti—$SnO_2$—Sb substrate electrode is obtained by preparing a sol-gel having a Sn:Sb of 9:1, coating the sol-gel on the titanium mesh having a pore diameter of 100 μm and a thickness of 200 μm, and sintering the titanium mesh.

2. A method for preparing the electrochemical membrane module according to claim 1, comprising the steps of:

(1) immersing the Ti—$SnO_2$—Sb substrate electrode in the MI—$TiO_2$ sol-gel, removing the Ti—$SnO_2$—Sb substrate electrode from the MI—$TiO_2$ sol-gel and sintering the Ti—$SnO_2$—Sb substrate electrode to obtain a coated electrode coated with the MI—$TiO_2$ sol-gel coating on a surface of the coated electrode, and then adhering the coated electrode to a surface of the ceramic micro-filtration membrane by epoxy resin, to obtain the MI-anodic composite membranes;

(2) vertically disposing the titanium mesh m the membrane bracket as the cathode, and adhering two of the MI-anodic composite membranes obtained in the step (1) to the both outer sides of the membrane bracket directly opposite to the cathode, wherein the Ti—$SnO_2$—Sb substrate electrode is placed opposite to the inner cavity of the membrane bracket.

3. The method according to claim 2, wherein the MI—$TiO_2$ sol-gel is prepared by adding titanium alkoxide and a template molecule into first absolute ethanol and stirring to obtain a molecular imprinting precursor solution, then mixing water, second absolute ethanol and glacial acetic acid under stirring to obtain a reaction medium solution, and finally adding the reaction medium solution to the molecular imprinting precursor solution dropwise under stirring.

4. The method according to claim 3, wherein the titanium alkoxide is at least one of tetrabutyl titanate, isopropyl titanate and titanium isopropoxide.

5. The method according to claim 3, wherein the template molecule is at least one of 2,4-dichlorophenoxyacetic acid, 3,4-dichlorophenoxyacetic acid, 2,3-dichlorophenoxy acetic acid and p-chlorophenol.

6. The method according to claim 3, wherein a molar ration of the template molecule, the titanium alkoxide, a sum of the first absolute ethanol and the second absolute ethanol, the glacial acetic acid, and to the water is 0.5:1:18:2:8.

* * * * *